US011767580B2

(12) United States Patent
Chrisman et al.

(10) Patent No.: US 11,767,580 B2
(45) Date of Patent: Sep. 26, 2023

(54) METAL COMPOSITES

(71) Applicant: Norse Biotech AS, Hamar (NO)

(72) Inventors: Ray W Chrisman, Midland, MI (US); Jens-Erlend Pederden, Elverum (NO)

(73) Assignee: NORSE BIOTECH AS (*) Notice: Subject to any disclaimer, the term of this patent is extended or adjusted under 35 U.S.C. 154(b) by 216 days.

(21) Appl. No.: 16/648,573

(22) PCT Filed: Sep. 24, 2018

(86) PCT No.: PCT/IB2018/001643
§ 371 (c)(1),
(2) Date: Mar. 18, 2020

(87) PCT Pub. No.: WO2019/243866
PCT Pub. Date: Dec. 26, 2019

(65) Prior Publication Data
US 2021/0371286 A1  Dec. 2, 2021

Related U.S. Application Data

(60) Provisional application No. 62/606,514, filed on Sep. 26, 2017.

(51) Int. Cl.
C22C 26/00 (2006.01)
C01B 32/168 (2017.01)
C09C 1/44 (2006.01)
B22F 1/102 (2022.01)
B82Y 30/00 (2011.01)
B82Y 40/00 (2011.01)

(52) U.S. Cl.
CPC .............. C22C 26/00 (2013.01); B22F 1/102 (2022.01); C01B 32/168 (2017.08); C09C 1/44 (2013.01); B82Y 30/00 (2013.01); B82Y 40/00 (2013.01)

(58) Field of Classification Search
CPC ......... C01B 32/168; C09C 1/44; B82Y 30/00; B82Y 40/00; B22F 1/102; C22C 1/1036; C22C 32/0084; C22C 47/04; C22C 47/08; C22C 2026/001; C22C 26/00
See application file for complete search history.

(56) References Cited

U.S. PATENT DOCUMENTS

| 3,871,834 | A | * | 3/1975 | Kuniya | C22C 49/14 428/614 |
| 8,012,574 | B2 | | 9/2011 | Tsushima et al. | |
| 2006/0243359 | A1 | * | 11/2006 | Sano | B21C 25/02 148/689 |
| 2007/0190348 | A1 | * | 8/2007 | Ichiki | C22C 1/1036 428/567 |
| 2012/0177905 | A1 | | 7/2012 | Seals | |
| 2016/0097129 | A1 | | 4/2016 | Jung et al. | |

OTHER PUBLICATIONS

Cho, et al., Effective load transfer by a chromium carbide nanostructure in a multi-walled carbon nanotube/copper matrix composite, Nanotechnology 2012; 23: 315705: pp. 1-10 (Year: 2012).*
"What is Aluminum Extrusion? The Process in 10 Steps," accessed online at: https://www.gabrian.com/what-is-aluminum-extrusion-process/ on Jan. 15, 2022 (Year: 2022).*
Mixing extruder makes 'impossible' alloys, accessed online at https://www.eurekamagazine.co.uk/content/technology/mixing-extruder-makes-impossible-alloys on Jun. 22, 2022 (Year: 2022).*
Skorpen, et al., Novel method of screw extrusion for fabricating Al/Mg (macro−) composites from aluminum alloy 6063 and magnesium granules, Trans. Nonferrous Met. Soc. China 2014; 24: 3886-3893 (Year: 2014).*
Tang, et al., Flow Features and Industrial Applications of TSE Rheoextrusion Process, FDMP 2007; 3(2): 129-146 (Year: 2007).*
Soylak, et al., Chromium and iron determinations in food and herbal plant samples by atomic absorption spectrometry after solid phase extraction on single-walled carbon nanotubes (SWCNTs) disk, Food and Chemical Toxicology 2010; 48: 1511-1515 (Year: 2010).*

(Continued)

Primary Examiner — Daniel C. McCracken
(74) Attorney, Agent, or Firm — Technology Law PLLC; Karen L. Kimble; Tim S. Stevens

(57) ABSTRACT

The product of and a process for forming a metal composite comprising particles of a carbon allotrope dispersed in a metal or a mixture of metals. In one embodiment, the process includes the steps of: (a) contacting particles of a carbon allotrope with surfactant having an organic portion and an anionic portion wherein the anionic portion is bonded to the organic portion and wherein the anionic portion is ionically associated with a cation so that the organic portion of the surfactant is adsorbed onto the surface of the particles of the carbon allotrope to produce surfactant modified particles; (b) contacting the surfactant modified particles with a transition metal cation and/or a post-transition metal cation and/or mixtures thereof to replace some or all of the cations of the surfactant modified particles with a transition metal cation and/or a post-transition metal cation and/or mixtures thereof to produce metal ion modified particles; (c) mixing the metal ion modified particles with a metal or a mixture of metals to form a mixture thereof; and (d) processing the mixture to form a metal composite comprising particles of the carbon allotrope dispersed in the metal or mixture of metal. In another embodiment the process includes the steps of: (a) contacting particles of a carbon allotrope with a surfactant having an organic portion and an anionic portion wherein the anionic portion is bonded to the organic portion and wherein the anionic portion is ionically associated with a transition metal cation and/or a post-transition metal cation and/or mixtures to produce metal ion modified particles; (b) mixing the metal ion modified particles with a metal or a mixture of metals to form a mixture thereof; and (c) processing the mixture to form a metal composite comprising particles of the carbon allotrope dispersed in the metal or mixture of metals.

9 Claims, No Drawings

(56) References Cited

OTHER PUBLICATIONS

Tjong, Recent progress in the development and properties of novel metal matrix nanocomposites reinforced with carbon annotubes and graphene nanosheets, Materials Science and Engineering R 2013; 74: 281-350 (Year: 2013).*

So, et al., SiC formation on carbon nanotube surface for improving wettability with aluminum, Composites Science and Technology 2013; 74: 6-13 (Year: 2013).*

* cited by examiner

METAL COMPOSITES

BACKGROUND OF THE INVENTION

The instant invention relates to the product of and process for forming metal composites that have enhanced performance compared to an unmodified metal matrix due to the use of carbon allotropes as a modifier. In general metal composites are desired since the performance of a metal can be significantly improved by the added phase which enables the use of the formed composite in higher valued applications. A range of properties such as tensile strength, hardness, electrical properties, and thermal properties can be enhanced based on the modifier chosen. As an example it should be possible to produce parts that have the density of aluminum and the strength of steel useful, for example and without limitation thereto, to reduce fuel consumption of land, sea and air transportation equipment.

Carbon allotropes are particularly useful as such a modifier since they have good performance properties, can be prepared from renewable resources, and are thermally stable to enable their use in metal matrixes. A carbon allotrope is a form of carbon and can be further subdivided by the hybridization of the carbon. Diamond is $sp^3$ and is less used as a modifier than the class based on $sp^2$ hybridization of carbon such as graphite, carbon black, carbon fiber, graphene, fullerenes, and carbon nanotubes. Some of these $sp^2$ allotropes such as carbon fiber, carbon nanotubes and graphene have exceptional strength which can significantly improve the tensile strength of metals when they are used as the modifier. In addition, carbon allotropes can have very useful thermal and electrical properties and they can also improve the hardness of materials to which they are added.

There are two main problem areas when using carbon allotropes to make metal composites. The first is the positioning of the carbon allotrope within the metal and the second is the interaction of the metal with the carbon allotrope.

For the first problem carbon fibers are normally positioned in a mold and the metal is forced to flow around the fibers. With long fiber the strength improvement is in the direction of the fiber axis. Thus to achieve strength in long parts the fibers are aligned down the long axis. For improvement in two dimensions the fibers must be oriented in both directions. This can be achieved by weaving a fabric of the fibers. These fairly well developed approaches mostly solve the placement problems for up to two dimensions. Achieving improved strength in three dimensions with carbon fibers is more difficult though various fiber placement approaches can help. However, as the placement becomes more complex it also becomes more difficult to uniformly distribute the metal about the fibers.

Another approach for the three dimensional placement problem is to use short fibers or nanomaterials that are randomly oriented within the metal. The difficulty with this approach is that these materials are difficult to uniformly disperse within the metal as the nanomaterials tend to agglomerate due to van der Waals forces. Various methods are used to help solve this problem but with only limited success.

Once the carbon allotropes are dispersed they need to interact with the matrix to enable the properties of the composite to fully benefit from the presence of the carbon allotrope. This problem was addressed in U.S. Pat. No. 3,871,834. In this expired patent which described aluminum modified with carbon fibers the interaction problem was well characterized and solutions suggested. The patent described making alloys of aluminum with various metals present that could bridge between the fibers and the aluminum. This was necessary because aluminum does not wet the carbon fibers, which means there is little interaction to enable enhanced properties. Proper choice of an alloy metal solved the interaction problem. However, the added metal raised the melting point of the aluminum such that aluminum carbide could form which aluminum carbide is brittle and leads to the loss of a property enhancement. In addition, in some cases the presence of the extra added metal in the bulk aluminum matrix resulted in an unfavorable balance of cost and performance for the resulting product.

Additional patents have described approaches to improve the balance of cost and performance for carbon allotrope modified metal composites. U.S. Pat. No. 8,012,574 describes the formation of a phenolic resin on nano-fibers to enable the fibers to be dispersed and mixed with titanium powder before several additional steps which leads to forming porous molded parts that are then pressure impregnated with molten aluminum. U.S. Pat. App. No. 20160097129 describes using a sol gel process to coat carbon nano-fibers with an oxide coating which is then subjected to several additional steps which may include the use of palladium to facilitate electroless coating of nickel or copper on the fibers, which metal coated fibers are then mixed with molten aluminum to form a composite.

The above-referenced patents highlight the problems inventors have had trying to solve the dual problems of dispersion and bonding to enable incorporation of carbon allotropes into metals. A broader view of the problems is presented in a review of the field, International Journal of Innovative Research in Science, Engineering and Technology Vol. 1, Issue 2, December 2012, which listed the general approaches that are being explored for solving these dual problems. The most common approach which is favored due to familiarity with the method and relative ease of implementation is termed "powder methods" and is achieved by dry mixing a carbon allotrope, such as carbon nanotubes, with metal particles using various methods and then melting the mixture. Other methods are specialized mostly around methods to pretreat the carbon allotrope to make it easier to disperse in a metal.

A recent research paper using carbon nanotubes was published in The Journal of Applied Research and Technology, Volume 14, Issue 4 (August 2016) Pages 215-224. This paper reviewed several newer approaches including intense mixing of carbon nanotubes into molten aluminum in an induction furnace. This approach solved the dispersion problem but did not address the matrix/nanotube interaction problem. Still the product showed some improvement in properties which were attributed to changes in the aluminum microstructure due to the uniform dispersion of the carbon nanotubes.

One cost effective coating approach for solving the placement or dispersion problem when referring to carbon nanomaterials to be mixed with aluminum powder was described in a research paper authored by Sridhar, I., & Narayanan, K. R. (2009) entitled "Processing and characterization of MWCNT reinforced aluminum matrix composites" published in The Journal of materials science, 44(7), in which the carbon nanotubes were coated with a simple surfactant, sodium dodecyl sulfate, before being dried and mixed with the aluminum powder and cold pressed.

While various approaches have been discussed which address one or both of the above-discussed dual problems encountered when making metal composites using carbon allotropes as modifiers, no simple, cost effective, strategy has been shown to work well. There is a need for a better solution to the difficulty of placement/dispersion of a carbon allotrope in the metal and the difficulty of obtaining a strong metal/carbon allotrope interaction or adhesion.

SUMMARY OF THE INVENTION

The instant invention is the discovery of the product of and process for forming metal composite comprising a carbon allotrope. In one embodiment, the instant invention is the product of and process for forming a metal composite comprising particles of a carbon allotrope dispersed in a metal or a mixture of metals, the process comprising the steps of: (a) contacting particles of a carbon allotrope with a surfactant comprising an organic portion and an anionic portion wherein the anionic portion is bonded to the organic portion and wherein the anionic portion is ionically associated with a cation so that the organic portion of the surfactant is adsorbed onto the surface of the particles of the carbon allotrope to produce surfactant modified particles; (b) contacting the surfactant modified particles with a transition metal cation and/or a post-transition metal cation and/or mixtures thereof to replace some or all of the cations of the surfactant modified particles with a transition metal cation and/or a post-transition metal cation and/or mixtures thereof to produce metal ion modified particles; (c) mixing the metal ion modified particles with a metal or a mixture of metals to form a mixture thereof; and (d) processing the mixture to form a metal composite comprising particles of the carbon allotrope dispersed in the metal or mixture of metals.

In another embodiment, the instant invention is the product of and process for forming a metal composite comprising particles of a carbon allotrope dispersed in a metal or mixture of metals, the process comprising the steps of: (a) contacting particles of a carbon allotrope with a surfactant comprising an organic portion and an anionic portion wherein the anionic portion is bonded to the organic portion and wherein the anionic portion is ionically associated with a transition metal cation and/or a post-transition metal cation and/or mixtures thereof to produce metal ion modified particles; (b) mixing the metal ion modified particles with a metal or a mixture of metals to form a mixture thereof; and (c) processing the mixture to form a metal composite comprising particles of the carbon allotrope dispersed in the metal or mixture of metals.

In yet another embodiment, the instant invention is the product of and a process for forming a metal composite comprising particles of a carbon allotrope dispersed in a metal or a mixture of metals, the process comprising the steps of: (a) contacting particles of a carbon allotrope with a surfactant comprising an organic portion and an anionic portion wherein the anionic portion is bonded to the organic portion and wherein the anionic portion is ionically associated with a cation so that the organic portion of the surfactant is adsorbed onto the surface of the particles of the carbon allotrope to produce surfactant modified particles; (b) contacting the surfactant modified particles with a transition metal cation and/or a post-transition metal cation and/or mixtures thereof to replace some or all of the cations of the surfactant modified particles with a transition metal cation and/or a post-transition metal cation and/or mixtures thereof to produce metal ion modified particles.

In still another embodiment, the instant invention is the product of and a process for forming a metal composite comprising particles of a carbon allotrope dispersed in a metal or a mixture of metals, the process comprising the steps of: (a) contacting particles of a carbon allotrope with a surfactant comprising an organic portion and an anionic portion wherein the anionic portion is bonded to the organic portion and wherein the anionic portion is ionically associated with a transition metal cation and/or a post-transition metal cation and/or mixtures to produce metal ion modified particles.

DETAILED DESCRIPTION OF THE INVENTION

The surfactant of the instant invention is comprised of an organic portion and an anionic portion. The anionic portion of the surfactant is ionically associated with a cation. The surfactant interacts with the solvent of the instant invention to break the van der Waals interaction of the particles of carbon allotrope of the instant invention with themselves. The metal modified particles of a carbon allotrope of the instant invention (which can be made by alternative routes which will be discussed below in detail) are characterized by the organic portion of the surfactant being absorbed onto the surface of a carbon allotrope particle with the cation now being a transition metal cation and/or a post-transition metal cation and/or mixtures thereof termed "metal modified particles". In the discussion below the transition metal cation and/or a post-transition metal cation and/or mixtures thereof which are termed "linker metal ions". The absorption of the organic portion of the surfactant with the carbon allotrope is believed to be either by a hydrophobic interaction or a pi bond stacking interaction with the surface of the carbon allotrope. The metal modified particles of carbon allotrope are then, for example and without limitation thereto, mixed with a metal or mixture of metals and processed to produce the metal composite of the instant invention by various means as detailed in the discussion below. The metal composite of the below described Example 1, for example, comprises about two percent by weight of metal modified particles of carbon allotrope. However, it should be understood that the percent by weight of metal modified particles of carbon allotrope of the metal composite of the instant invention can be less than two percent by weight (such as one percent or one half percent or less) or more than two percent by weight (such as five percent, ten percent, twenty percent or more).

The first broad aspect of this invention is using a surfactant to coat the carbon allotrope which when working with carbon nanomaterials will be easily detected by the fact that the carbon nanomaterial will be evenly dispersed in a solvent such as water. The metal counter ion of the surfactant such as sodium in the case of sodium dodecyl sulfate can then be ion exchanged with a linker metal such as iron, nickel, or titanium or others from a broader list of suitable linker metals. After ion exchange to add the desired linker metal the solvent will be removed. The coated carbon allotrope can then be added to the metal.

Multiple approaches to the method of addition of the coated carbon allotrope to the metal are possible. For example, the coated carbon allotrope can be dry mixed with metal particles before heating, and then various methods of powder heating can be used, this includes heating the powder in an induction furnace for rapid mixing during heating. Also the metal can be heated separately and then the coated carbon allotrope can be mixed into the metal using various methods. For example, the coated carbon allotrope can be added to molten metal in an extruder for good mixing, or the coated carbon allotrope can be added to molten metal and mechanical mixing used to disperse it. Also the coated carbon allotrope can be mixed into a polymer which is then used to make a porous mold into which the molten metal is pressure impregnated, or the carbon allotrope can be cold pressed with the metal using various methods known in the art.

When aluminum is the metal it is useful to minimize the working temperature of the molten metal to which the coated carbon allotrope is added since higher temperatures are known to increase the potential formation of aluminum carbide which is brittle. In some cases it is also useful to minimize the residence time of this step when using carbon nanotubes as they can unravel to form graphene. However in some cases it may be useful to form graphene as it can offer positive improvements to some properties of the composite.

As discussed above, allotropes of carbon have a range of useful properties such as tensile strength, hardness, electrical properties, and thermal properties that can improve the performance of a metal when added as a modifier to form a composite. Most metals can be considered for composite formation using carbon allotropes since the melting point of most metals is well below the melting point of most carbon allotropes.

Particles of carbon allotropes tend to clump together when added to a liquid whether the liquid is a solvent or a molten metal due to van der Waals forces between the particles. In addition, molten metals often do not wet the carbon allotropes since the carbon allotropes tend to be hydrophobic. To solve the clumping problem the carbon allotrope materials are either strongly held in place during molten metal addition such as with carbon fibers, or intensely mixed, or coated to break the van der Waals forces between smaller particles of carbon allotropes.

The coating of particles of a carbon allotrope such as carbon nanotubes by a surfactant can be demonstrated since when untreated carbon nanotubes are added to water they form a separate layer. It is then possible to titrate the mixture with a surfactant such as sodium dodecyl sulfate until the carbon nanotubes are uniformly dispersed throughout the solution. The dispersion occurs since the surfactant disrupts the van der Waals forces between the now individually coated carbon nanotubes. The surfactant is strongly held by the carbon allotrope surface and it is very difficult to remove. Many types of surfactants can be used but not all types work well. The best surfactants are believed to have one end that interacts with the carbon surface either by a hydrophobic interaction or a pi bond stacking interaction with the surface. The other end has an ionic group that interacts with various cations such as sodium or potassium or other cations to give the surfactant good solubility. With one end strongly attached to the carbon surface the surfactant can act much like an ion exchange resin since the ionic end, such as a sulfate or carboxylate group, of the surfactant is facing the solvent such as water. Simple straight chain surfactants often work well since they can efficiently pack on the carbon surface.

The separation of individual carbon allotrope particles is important since clumps tend to lead to ineffective property modifications. In fact in the case where carbon nanotubes are used to improve the strength of a metal it has been stated in the references mentioned above that the composite will actually be weaker than the unmodified metal if the carbon nanotubes are not well dispersed.

The choice of surfactant and the ratio of the surfactant relative to carbon allotrope depend on the amount of surface area of the carbon allotrope and the type of property to be enhanced by composite formation. Strength applications are often enhanced with well coated carbon surfaces whereas electrical properties can be enhanced when there is some contact between the particles of the carbon allotrope. For some properties or metals it can be useful to avoid certain elements in the surfactant such as sulfur.

In the instant invention particles of a carbon allotrope are dispersed in a solvent with a surfactant. The solvent and any excess surfactant can then be removed by filtering with fresh solvent containing a dissolved linker metal ion such as iron, nickel, or titanium. In the case where the surfactant is dodecyl sodium sulfate, the linker metal ions replaces the sodium on the surfactant. One or more additional cycles of drying and solvent addition with dissolved linker metal ions can be added to insure metal ion replacement. At this point the particles of carbon allotrope are filtered to remove excess solvent and dried. It should be understood that in some cases it is possible to use a surfactant where the linker metal ion is already a surfactant cation before such surfactant is used to disperse the particles of carbon allotrope in the solvent.

The linker metal ion is chosen based on its ability to react with the carbon allotrope to form an interaction layer between the carbon allotrope and the bulk metal. The following is an example set of elements believed to form such an interaction layer when aluminum is the bulk metal; Cr, Ce, V, U, Th, Nb, Si, Mo, Fe, Ta, Ti, Zr, W, Hf, Co, and Mn.

Where the carbon allotrope is strongly held in place such that there is not a clumping problem (such as with woven carbon fibers) it is still useful to coat the carbon allotrope with the surfactant and then exchange the surfactant cation with a linker cation such that the linker metal is well positioned about the carbon allotrope for bonding with the metal matrix such as with aluminum.

Without wishing to be limited by theory it is believed that in the case where the molten metal is aluminum the surfactant of the instant invention will be decomposed by the molten metal and the linker metal atoms will be reduced from a metal ion to a metal which then forms a carbide with the carbon and link to the aluminum. It is believed that the well positioned linker metal atoms of the instant invention form strong links between the carbon allotrope and the aluminum.

It should be understood that the coated carbon allotropes of the instant invention can also be used in powder forming techniques. In this method the coated carbon allotropes are dry mixed with metal particles to form a powder that is then melted or sintered to form the composite. In addition, powders containing the coated carbon allotropes of the instant invention can also be used in other methods known to those skilled in the art.

When carbon allotrope particles of the instant invention are used with aluminum it is better that they be rapidly well mixed into molten aluminum and then cooled since long exposures to higher temperature is believed to promote the formation of aluminum carbide which is believed to reduce composite performance.

The coated carbon allotrope of the instant invention can be mechanically mixed into the molten metal using standard agitators. Another method of mixing, that also gives good results, is to add the coated carbon allotrope particles of the instant invention to the molten metal in an extruder, which process can be used to make long extruded composite parts. However carbon allotrope which is present as a fiber can be expected to orient in the extruder in the direction of the extrusion which can be good as the oriented fibers give more strength in the long direction as they tend to align in the extruded direction. Such alignment can also be expected in some cases to impact other properties such electrical conductivity. It is also possible to use an extruder to make a composite concentrate. In this case the coated carbon allotrope of the instant invention is added at higher concentration from the extruder which can then be formed into pellets, which pellets can then mixed with molten metal to make a final composite metal product.

Examples

Example 1. Carbon nanotubes, water and sufficient sodium dodecyl sulfate are mixed to form a uniform dispersion of sodium dodecyl sulfate coated carbon nanotubes. The dispersion is filtered to produce wet sodium dodecyl sulfate coated carbon nanotubes. The wet sodium dodecyl sulfate coated carbon nanotubes are washed with water containing chromium ions to produce chromium dodecyl sulfate coated carbon nanotubes which are then dried. Two parts of dried chromium dodecyl sulfate coated carbon nanotubes are mixed for ten minutes with ninety eight parts of molten aluminum and then poured into a mold to produce a part for testing. The tensile strength of the part is superior to a part made by casting the unmodified aluminum in the mold.

Example 2. Carbon nanotubes, water and sufficient sodium dodecyl sulfate are mixed to form a uniform dispersion of sodium dodecyl sulfate coated carbon nanotubes. The dispersion is filtered to produce wet sodium dodecyl sulfate coated carbon nanotubes. The wet sodium dodecyl sulfate coated carbon nanotubes are washed with water containing chromium ions made by preparing a 10% w/w solution of chromium nitrate in water to produce chromium dodecyl sulfate coated carbon nanotubes which are then dried. Two parts of dried chromium dodecyl sulfate coated carbon nanotubes are mixed for ten minutes with ninety eight parts of molten aluminum and then poured into a mold to produce a part for testing. The tensile strength of the part is superior to a part made by casting the unmodified aluminum in the mold.

Example 3. Carbon nanotubes, water and sufficient sodium dodecyl sulfate are mixed to form a uniform dispersion of sodium dodecyl sulfate coated carbon nanotubes. The dispersion is filtered to produce wet sodium dodecyl sulfate coated carbon nanotubes. The wet sodium dodecyl sulfate coated carbon nanotubes are washed with water containing titanium ions made by preparing a 10% w/w solution of titanium nitrate in water to produce titanium dodecyl sulfate coated carbon nanotubes which are then dried. Two parts of dried titanium dodecyl sulfate coated carbon nanotubes are mixed for ten minutes with ninety eight parts of molten aluminum and then poured into a mold to produce a part for testing. The tensile strength of the part is superior to a part made by casting the unmodified aluminum in the mold.

Example 4. Carbon nanotubes, water and sufficient sodium dodecyl sulfate are mixed to form a uniform dispersion of sodium dodecyl sulfate coated carbon nanotubes. The dispersion is filtered to produce wet sodium dodecyl sulfate coated carbon nanotubes. The wet sodium dodecyl sulfate coated carbon nanotubes are washed with water containing zirconium ions made by preparing a 10% w/w solution of zirconium sulfate in water to produce zirconium dodecyl sulfate coated carbon nanotubes which are then dried. Two parts of dried zirconium dodecyl sulfate coated carbon nanotubes are mixed for ten minutes with ninety eight parts of molten aluminum and then poured into a mold to produce a part for testing. The tensile strength of the part is superior to a part made by casting the unmodified aluminum in the mold.

Example 5. Carbon nanotubes, water and sufficient sodium dodecyl sulfate are mixed to form a uniform dispersion of sodium dodecyl sulfate coated carbon nanotubes. The dispersion is filtered to produce wet sodium dodecyl sulfate coated carbon nanotubes. The wet sodium dodecyl sulfate coated carbon nanotubes are washed with water containing uranium ions made by preparing a 10% w/w solution of uranyl nitrate in water to produce uranium dodecyl sulfate coated carbon nanotubes which are then dried. Two parts of dried uranium dodecyl sulfate coated carbon nanotubes are mixed for ten minutes with ninety eight parts of molten aluminum and then poured into a mold to produce a part for testing. The tensile strength of the part is superior to a part made by casting the unmodified aluminum in the mold.

Example 6. Carbon nanotubes, water and sufficient sodium dodecyl sulfate are mixed to form a uniform dispersion of sodium dodecyl sulfate coated carbon nanotubes. The dispersion is filtered to produce wet sodium dodecyl sulfate coated carbon nanotubes. The wet sodium dodecyl sulfate coated carbon nanotubes are washed with water containing iron ions made by preparing a 10% w/w solution of iron nitrate in water to produce iron dodecyl sulfate coated carbon nanotubes which are then dried. Two parts of dried iron dodecyl sulfate coated carbon nanotubes are mixed for ten minutes with ninety eight parts of molten aluminum and then poured into a mold to produce a part for testing. The tensile strength of the part is superior to a part made by casting the unmodified aluminum in the mold.

Example 7. Carbon nanotubes, water and sufficient sodium stearate are mixed to form a uniform dispersion of sodium stearate coated carbon nanotubes. The dispersion is filtered to produce wet sodium stearate coated carbon nanotubes. The wet sodium stearate coated carbon nanotubes are washed with water containing chromium ions made by preparing a 10% w/w solution of chromium nitrate in water to produce chromium stearate coated carbon nanotubes which are then dried. Two parts of dried chromium stearate coated carbon nanotubes are mixed for ten minutes with ninety eight parts of molten aluminum and then poured into a mold to produce a part for testing. The tensile strength of the part is superior to a part made by casting the unmodified aluminum in the mold.

Example 8. Carbon nanotubes, water and sufficient sodium laureth sulfate are mixed to form a uniform dispersion of sodium laureth sulfate coated carbon nanotubes. The dispersion is filtered to produce wet sodium laureth sulfate coated carbon nanotubes. The wet sodium laureth sulfate coated carbon nanotubes are washed with water containing chromium ions made by preparing a 10% w/w solution of chromium nitrate in water to produce chromium laureth sulfate coated carbon nanotubes which are then dried. Two parts of dried chromium laureth sulfate coated carbon nanotubes are mixed for ten minutes with ninety eight parts of molten aluminum and then poured into a mold to produce a part for testing. The tensile strength of the part is superior to a part made by casting the unmodified aluminum in the mold.

Example 9. Carbon black, water and sufficient sodium dodecyl sulfate are mixed to form a uniform dispersion of sodium dodecyl sulfate coated carbon black particles. The dispersion is filtered to produce wet sodium dodecyl sulfate coated carbon black. The wet sodium dodecyl sulfate coated carbon black particles are washed with water containing chromium ions made by preparing a 10% w/w solution of chromium nitrate in water to produce chromium dodecyl sulfate coated carbon black particles which are then dried.

Ten parts of dried chromium dodecyl sulfate coated carbon black particles are mixed for ten minutes with ninety parts of molten aluminum and then poured into a mold to produce a part for testing. The surface hardness of the part is superior to a part made by casting the unmodified aluminum in the mold.

Example 10. Carbon fiber is coiled in the bottom of a flask and a 10% solution of sodium dodecyl sulfate in water is added to completely cover the fibers. The solution is stirred for several minutes to uniformly coat the carbon fibers with sodium dodecyl sulfate solution. The solution is removed from the fibers and washed once with distilled water which is removed to produce wet sodium dodecyl sulfate coated carbon fibers. The wet sodium dodecyl sulfate coated carbon fibers are covered with water containing chromium ions made by preparing a 10% w/w solution of chromium nitrate in water to produce chromium dodecyl sulfate coated carbon fibers. The excess solution is poured off and the fibers are then dried. The coated carbon fibers are stretched between two points in a vertical mold and molten aluminum is poured into a reservoir with a bottom connection between it and the mold such that the molten aluminum flows up over the fibers. The amount of carbon fibers in the aluminum is about 20%. The tensile strength of the part in the fiber direction is superior to a part made by casting the unmodified aluminum in the same type mold.

Example 11. A mixture of 80% carbon black and 20% carbon nanotubes, water and sufficient sodium dodecyl sulfate are mixed to form a uniform dispersion of sodium dodecyl sulfate coated carbon allotropes. The dispersion is filtered to produce wet sodium dodecyl sulfate coated carbon allotropes. The wet sodium dodecyl sulfate coated carbon allotropes are washed with water containing chromium ions made by preparing a 10% w/w solution of chromium nitrate in water to produce chromium dodecyl sulfate coated carbon allotropes which are then dried. Ten parts of dried chromium dodecyl sulfate coated carbon allotropes are mixed for ten minutes with ninety parts of molten aluminum and then poured into a mold to produce a part for testing. The tensile strength and the hardness of the part are superior to a part made by casting the unmodified aluminum in the mold.

Example 12. Graphene, water and sufficient sodium dodecyl sulfate are mixed to form a uniform dispersion of sodium dodecyl sulfate coated graphene. The dispersion is filtered to produce wet sodium dodecyl sulfate coated graphene particles. The wet sodium dodecyl sulfate coated graphene particles are washed with water containing chromium ions made by preparing a 10% w/w solution of chromium nitrate in water to produce chromium dodecyl sulfate coated graphene particles which are then dried. Two parts of dried chromium dodecyl sulfate coated graphene particles are mixed for ten minutes with ninety eight parts of molten aluminum and then poured into a mold to produce a part for testing. The tensile strength of the part is superior to a part made by casting the unmodified aluminum in the mold.

Example 13. Carbon nanotubes, water and sufficient sodium dodecyl sulfate are mixed to form a uniform dispersion of sodium dodecyl sulfate coated carbon nanotubes. The dispersion is filtered to produce wet sodium dodecyl sulfate coated carbon nanotubes. The wet sodium dodecyl sulfate coated carbon nanotubes are washed with water containing chromium ions made by preparing a 10% w/w solution of chromium nitrate in water to produce chromium dodecyl sulfate coated carbon nanotubes which are then dried. Two parts of dried chromium dodecyl sulfate coated carbon nanotubes are mixed for ten minutes with ninety eight parts of aluminum powder using a mortar and pestle in a dry box. The mixture is heated to a molten state and then poured into a mold to produce a part for testing. The tensile strength of the part is superior to a part made by casting the unmodified aluminum in the mold.

Example 14. Carbon nanotubes, water and sufficient sodium dodecyl sulfate are mixed to form a uniform dispersion of sodium dodecyl sulfate coated carbon nanotubes. The dispersion is filtered to produce wet sodium dodecyl sulfate coated carbon nanotubes. The wet sodium dodecyl sulfate coated carbon nanotubes are washed with water containing chromium ions made by preparing a 10% w/w solution of chromium nitrate in water to produce chromium dodecyl sulfate coated carbon nanotubes which are then dried. Two parts of dried chromium dodecyl sulfate coated carbon nanotubes are mixed for ten minutes with ninety eight parts of aluminum powder using a mortar and pestle in a dry box. The mixture is heated to a molten state in an induction furnace and then poured into a mold to produce a part for testing. The tensile strength of the part is superior to a part made by casting the unmodified aluminum in the mold.

Example 15. Chromium dodecyl sulfate is prepared by adding a 10% solution of chromium nitrate in water to a 10% solution of sodium dodecyl sulfate in water which forms filterable particles. The precipitate is filtered. Carbon nanotubes, water and chromium dodecyl sulfate particles are mixed to form a uniform mixture in water. The mixture is filtered to produce wet chromium dodecyl sulfate coated carbon nanotubes. The solids are filtered and then dried. Two parts of dried chromium dodecyl sulfate coated carbon nanotubes are mixed for ten minutes with ninety eight parts of aluminum powder using a mortar and pestle in a dry box. The mixture is heated to a molten state and then poured into a mold to produce a part for testing. The tensile strength of the part is superior to a part made by casting the unmodified aluminum in the mold.

Example 16. Chromium dodecyl sulfate is prepared by adding a 10% solution of chromium nitrate in water to a 10% solution of sodium dodecyl sulfate in water which forms filterable particles. The precipitate is filtered and dried. 5 parts of dried chromium dodecyl sulfate and 5 parts of carbon nanotubes are mixed for ten minutes with ninety parts of aluminum powder using a mortar and pestle in a dry box. The mixture is heated to a molten state and then poured into a mold to produce a part for testing. The tensile strength of the part is superior to a part made by casting the unmodified aluminum in the mold.

Example 17. Carbon nanotubes, water and sufficient sodium dodecyl sulfate are mixed to form a uniform dispersion of sodium dodecyl sulfate coated carbon nanotubes. The dispersion is filtered to produce wet sodium dodecyl sulfate coated carbon nanotubes. The wet sodium dodecyl sulfate coated carbon nanotubes are washed with water containing chromium ions made by preparing a 10% w/w solution of chromium nitrate in water to produce chromium dodecyl sulfate coated carbon nanotubes which are then dried. Two parts of dried chromium dodecyl sulfate coated carbon nanotubes are mixed for ten minutes with ninety eight parts of molten magnesium and then poured into a mold to produce a part for testing. The tensile strength of the part is superior to a part made by casting the unmodified magnesium in the mold.

Example 18. Carbon nanotubes, water and sufficient sodium dodecyl sulfate are mixed to form a uniform dispersion of sodium dodecyl sulfate coated carbon nanotubes. The dispersion is filtered to produce wet sodium dodecyl sulfate coated carbon nanotubes. The wet sodium dodecyl sulfate coated carbon nanotubes are washed with water containing chromium ions made by preparing a 10% w/w solution of chromium nitrate in water to produce chromium dodecyl sulfate coated carbon nanotubes which are then dried. Two parts of dried chromium dodecyl sulfate coated carbon nanotubes are mixed for ten minutes with ninety eight parts of a molten aluminum magnesium alloy and then poured into a mold to produce a part for testing. The tensile strength of the part is superior to a part made by casting the unmodified aluminum magnesium alloy in the mold.

Example 19. Carbon black, water and sufficient sodium dodecyl sulfate are mixed to form a uniform dispersion of sodium dodecyl sulfate coated carbon black particles. The dispersion is filtered to produce wet sodium dodecyl sulfate coated carbon black. The wet sodium dodecyl sulfate coated carbon black particles are washed with water containing chromium ions made by preparing a 10% w/w solution of chromium nitrate in water to produce chromium dodecyl sulfate coated carbon black particles which are then dried. Ten parts of dried chromium dodecyl sulfate coated carbon black particles are mixed for ten minutes with ninety parts of molten gold and then poured into a mold to produce a part for testing. The surface hardness of the part is superior to a part made by casting the unmodified gold in the mold.

Example 20. Carbon black, water and sufficient sodium dodecyl sulfate are mixed to form a uniform dispersion of sodium dodecyl sulfate coated carbon black particles. The dispersion is filtered to produce wet sodium dodecyl sulfate coated carbon black. The wet sodium dodecyl sulfate coated carbon black particles are washed with water containing chromium ions made by preparing a 10% w/w solution of chromium nitrate in water to produce chromium dodecyl sulfate coated carbon black particles which are then dried. Ten parts of dried chromium dodecyl sulfate coated carbon black particles are mixed for ten minutes with ninety parts of molten silver and then poured into a mold to produce a part for testing. The surface hardness of the part is superior to a part made by casting the unmodified silver in the mold.

CONCLUSION

While the instant invention has been described above according to its preferred embodiments, it can be modified within the spirit and scope of this disclosure. This application is therefore intended to cover any variations, uses, or adaptations of the instant invention using the general principles disclosed herein. Further, the instant application is intended to cover such departures from the present disclosure as come within the known or customary practice in the art to which this invention pertains.

What is claimed is:

1. A process for forming metal ion modified particles comprising particles of a carbon allotrope which can be dispersed in a metal or a mixture of metals, the process comprising the steps of:
   (a) contacting particles of a carbon allotrope selected from the group consisting of graphite, carbon black, carbon fiber, graphene, fullerenes, and carbon nanotubes with a water soluble surfactant comprising an organic portion and an anionic portion wherein the anionic portion is bonded to the organic portion and wherein the anionic portion is either:
   (i) ionically associated with a cation so that the organic portion of the surfactant is adsorbed onto the surface of the particles of the carbon allotrope to produce surfactant modified particles; or (ii) ionically associated with a metal cation selected from the group consisting of Cr, Ce, V, U, Th, Nb, Si, Mo, Fe, Ta, Ti, Zr, W, Hf, Co, and Mn or mixtures thereof to produce metal ion modified particles; and
   (b) contacting the surfactant modified particles of (i) with a metal cation selected from the group consisting of Cr, Ce, V, U, Th, Nb, Si, Mo, Fe, Ta, Ti, Zr, W, Hf, Co, and Mn or mixtures thereof to replace some or all of the cations of the surfactant modified particles with a metal cation or mixtures thereof to produce metal ion modified particles which are dried; and
   wherein either after step (a) (ii) or step (b) mixing the dried metal ion modified particles with a metal or a mixture of metals to form a mixture thereof, and
   (c) processing the mixture to form a metal composite comprising particles of the carbon allotrope dispersed in the metal or mixture of metals.

2. The process of claim 1, wherein the metal cation or mixtures thereof comprises chromium.

3. The process of claim 1, wherein the carbon allotrope is carbon nanotubes.

4. The process of claim 1, wherein either after step (a) (ii) or step (b) wherein the metal ion modified particles are added to a molten metal or mixture of molten metals to form a metal composite.

5. The process of claim 4, wherein the metal is aluminum or magnesium.

6. The process of claim 1, wherein after either step (a) (ii) or step (b) the metal ion modified particles are mixed with a metal or a mixture of metals to form a dry mixture thereof.

7. The process of claim 6, wherein the dry mixture is further processed by heating to form a metal composite comprising particles of the carbon allotrope dispersed in the metal or mixture of metals.

8. The process of claim 6, wherein the metal is aluminum or magnesium.

9. A process for forming metal ion modified particles comprising particles of a carbon allotrope which can be dispersed in a metal or a mixture of metals, the process comprising the steps of:
   (a) contacting particles of a carbon allotrope selected from the group consisting of graphite, carbon black, carbon fiber, graphene, fullerenes, and carbon nanotubes with a water soluble surfactant comprising an organic portion and an anionic portion wherein the anionic portion is bonded to the organic portion and wherein the anionic portion is either:
   (i) ionically associated with a cation so that the organic portion of the surfactant is adsorbed onto the surface of the particles of the carbon allotrope to produce surfactant modified particles; or (ii) ionically associated with a metal cation selected from the group consisting of Cr, Ce, V, U, Th, Nb, Si, Mo, Fe, Ta, Ti, Zr, W, Hf, Co, and Mn or mixtures thereof to produce dried metal ion modified particles; and
   (b) contacting the surfactant modified particles of (i) with a metal cation selected from the group consisting of Cr, Ce, V, U, Th, Nb, Si, Mo, Fe, Ta, Ti, Zr, W, Hf, Co, and Mn or mixtures thereof to replace some or all of the cations of the surfactant modified particles with a metal cation or mixtures thereof to produce metal ion modified particles which are dried; wherein either after step (a) (ii) or step (b) wherein the dried metal ion modified particles then are added to molten metal or a mixture of molten metals in an extruder to provide a metal composite.

* * * * *